Patented June 22, 1943

2,322,258

UNITED STATES PATENT OFFICE 2,322,258

DEHYDROHALOGENATION OF HALOGENATED ORGANIC COMPOUNDS

Charles J. Strosacker and Forrest C. Amstutz, Midland, Mich., assignors to The Dow Chemical Company, Midland, Mich., a corporation of Michigan No Drawing. Application December 24, 1938, Serial No. 247,678

13 Claims. (Cl. 260—654)

This invention concerns an improved method of splitting hydrogen halide from halogenated organic compounds by means of alkali.

The dehydrohalogenation of organic compounds by means of alkali is a well known general reaction which has been applied in splitting hydrogen halide from a wide variety of halogenated organic compounds to produce numerous unsaturated organic compounds. The reaction has been applied in making: ethylene from ethyl bromide, vinyl chloride from ethylene chloride, acetylene from vinyl bromide, 1-chloro propylene from propylidene chloride, 2-bromopropylene from acetone dibromide, allylene from 1-bromo propylene, cyclohexane from cyclohexyl chloride, acetylene dicarboxylic acid from dibromo succinic acid, beta-methyl crotonaldehyde from the acetal of bromo-isovaleraldehyde, etc. A common characteristic of the organic reactants for such reactions is that they each contain in a non-aromatic, i. e., an aliphatic or alicyclic, portion of the molecule the radical

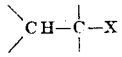

wherein X represents halogen.

The reaction has usually been carried out by heating the organic reactant with a solution of potassium hydroxide in a monohydric alcohol such as ethanol, but in certain instances sodium hydroxide has been used in place of potassium hydroxide or water has been used instead of the alcohol. Usually these substitutions decrease the rate of reaction or the yield of the desired unsaturated product.

We have now discovered that polyhydric alcohols and hydroxy-ethers are highly active promoters for the dehydrohalogenation of halogenated organic compounds with alkali and that by carrying such reaction out in the presence of a polyhydric alcohol or a hydroxy-ether, either sodium hydroxide or potassium hydroxide may be used as the alkaline reactant and the latter may be employed in solid form or dissolved in an alcohol or water, as desired. The polyhydric alcohol or its ether apparently serves as a dehydrohalogenation catalyst, since it need only be present in small proportion to be effective, but it may also have other functions in the reaction. For convenience, it will hereinafter be referred to as a catalyst.

Among the various polyhydric alcohols and hydroxy-ethers which may be used to promote dehydrohalogenation reactions in accordance with the invention are ethylene glycol, diethylene glycol, triethylene glycol, tetraethylene glycol, propylene glycol, dipropylene glycol, butylene glycol, glycerine, 1,3-dihydroxy propane, 1,3-dihydroxy butane, 1,4-dihydroxy butane, beta-ethoxy ethyl alcohol, beta-phenoxy ethyl alcohol, beta-(2-chloro-phenoxy) ethyl alcohol, beta-(4-tertiary-butyl-phenoxy) ethyl alcohol, beta-isopropoxy ethyl alcohol, etc. Apparently any stable polyhydric alcohol or hydroxy ether derived therefrom may be used for this purpose. The glycols are excellent catalysts, but hydroxy-ethers, e. g. poly-glycols, are even more effective. Among the poly-glycols, we have observed that the catalytic activity becomes greater as the number of glycol residues (and therefore ether groups) in the molecule is increased. For instance, diethylene glycol is more active than ethylene glycol as a catalyst; triethylene glycol is more active than diethylene glycol, tetraethylene glycol is more active than triethylene glycol, etc.

The halogenated organic reactant may be any of those capable of being dehydrohalogenated with alkali by the known methods hereinbefore discussed. However, the invention is particularly concerned with the dehydrohalogenation of saturated polyhalo aliphatic hydrocarbons such as ethylene chloride or bromide, propylene chloride or bromide, butylene chloride or bromide, trichloro ethane, tetrachloro ethane, etc. to produce corresponding halogenated olefines, e. g. vinyl chloride or bromide, chloro propylene, chloro butylene, dichloro ethylene, trichloro ethylene, etc.

The alkaline reactant may be sodium hydroxide, potassium hydroxide or any other alkali which is effective in dehydrohalogenating halogenated organic compounds by the previously known methods hereinbefore mentioned.

The reactants may be used in any desired proportions and the catalyst, i. e., polyhydric alcohol or hydroxy-ether, may also be used in nearly any proportion, but there are certain preferred proportions of the reactants, which may vary somewhat, depending upon the result desired and there is a minimum proportion of catalyst below which the desired activation of the reaction is not attained. In general when it is desired to split only one molecule of hydrogen halide from a polyhalogenated organic compound capable of losing two or more molecules of hydrogen halide the organic reactant is used in a proportion exceeding the molecular equivalent of the alkali. When two molecules of hydrogen halide are to be split from the organic reactant the latter may of course be used in a smaller proportion. The minimum operable proportion of catalyst is dependent somewhat upon the particular reactants and catalyst employed but usually 0.001 mol of catalyst per mol of alkali is sufficient to promote the reaction.

The procedure followed in carrying the reaction out in the presence of the catalyst may correspond to those heretofore employed when operating without catalysts, i. e., a mixture of the reactants and catalyst may be heated when necessary, to a reaction temperature in the presence or absence of a medium such as water or a monohydric alcohol and the desired organic product may be distilled during or subsequent to the reaction. By using the more active of our catalysts, the reaction may sometimes be started at room temperature and carried to completion without adding heat other than that generated by the reaction.

The advantages of using the catalyst are greatest, of course, when operating under conditions which would not permit satisfactory reaction without aid of the catalyst. Thus, alcoholic potassium hydroxide solutions are in themselves effective dehydrohalogenating agents and while a reaction carried out with alcoholic potassium hydroxide may be promoted by the addition of a polyhydric alcohol or its ether, the advantages of using the catalyst may not be great. It is when attempt is made to lessen the cost of carrying out such reaction by omitting the monohydric alcohol medium or by substituting sodium hydroxide or other alkali in place of potassium hydroxide that the advantages of employing the catalyst become greatest. Accordingly, the invention is particularly directed to operating with the catalyst in the absence of the usual monohydric alcohol medium using sodium hydroxide as the alkaline reactant.

Operation in the preferred manner just indicated may be carried out in the presence or absence of water, but we have found, when using our catalysts, that water tends to retard the reaction; hence we preferably operate in the substantial absence of water. The organic reactant is preferably mixed with the desired proportions of solid comminuted sodium hydroxide and the polyhydric alcohol or hydroxy-ether catalyst. About 1 mole of the catalyst is usually employed per 100 moles of sodium hydroxide, but the catalyst may of course be used in as large a proportion as desired. The mixture is heated, preferably with stirring, to the reaction temperature which usually is between 50° and 150° C. In most instances the mixture is heated at atmospheric pressure and the unsaturated organic product is distilled off as it is formed, but there may be instances where it will be desirable to heat the mixture under pressure in a bomb or autoclave and to distill the product after completing the reaction. In many instances the product is recovered directly in substantially pure form, but when necessary it may be further purified in known manner, e. g., by distillation.

The following examples illustrate several ways in which the principle of the invention has been applied, but they are not to be construed as limiting the invention.

*Example 1*

The purpose of this example is to demonstrate (1) the efficiency of polyhydric alcohols and hydroxy-ethers as catalysts for a dehydrohalogenation reaction; (2) that such catalyst is far more effective than a monohydric alcohol in promoting the reaction; and (3) that the reaction will occur in the presence of water, but is retarded when large proportions of water are used. In each of a series of experiments, a reaction mixture having the composition given in the following table was heated under reflux with stirring for the period of time also given in the table, while passing any vinyl chloride evolved from the mixture into a trap, cooled with an acetone and carbon dioxide mixture, where it was condensed and collected. In those experiments wherein water was not used as a medium, the sodium hydroxide was employed in a solid flaked form which was nearly anhydrous. The table gives the quantities of materials employed and the yields of vinyl chloride, based both upon the sodium hydroxide employed and upon the sodium hydroxide reacted. The "glycol residue" mentioned in the table is a mixture of diethylene glycol, triethylene glycol, etc., obtained in the manufacture of ethylene glycol.

TABLE

| Run No. | Reaction mixture | | | | | Reaction period, hours | Vinyl chloride | | |
|---|---|---|---|---|---|---|---|---|---|
| | $C_2H_4Cl_2$ grams | NaOH grams | $H_2O$ grams | Catalyst | | | Grams | Percent yield on NaOH used | Percent yield on NaOH consumed |
| | | | | Kind | Grams | | | | |
| 1 | 100 | 46 | 54 | None | | 2.5 | (1) | (1) | (1) |
| 2 | 100 | 46 | 54 | $CH_3OH$ | 2 | 3.5 | (1) | (1) | (1) |
| 3 | 100 | 46 | 54 | Glycol residue | 2 | 3.5 | 20 | 27.8 | 96 |
| 4 | 100 | 40.2 | 19.8 | None | | 2 | (1) | (1) | (1) |
| 5 | 100 | 40.2 | 19.8 | Glycol residue | 2 | 2 | 32 | 51 | 97 |
| 6 | 100 | 40 | 10 | None | | 6 | (2) | (2) | (2) |
| 7 | 100 | 40 | 10 | Glycol residue | 2 | 1.5 | 44 | 70.4 | 98 |
| 8 | 100 | 40 | None | None | | 4 | (3) | (3) | (3) |
| 9 | 100 | 40 | None | $CH_3OH$ | 2 | 3.5 | 15 | 24 | 96 |
| 10 | 100 | 40 | None | $C_5H_{11}OH$ amyl alcohol | 2 | 3.5 | (4) | (4) | (4) |
| 11 | 100 | 40 | None | Ethylene glycol | 1 | 3.5 | 18 | 28.8 | 89 |
| 12 | 100 | 40 | None | Ethylene glycol | 1 | 7 | 38.8 | 62.1 | 93 |
| 13 | 100 | 40 | None | Di-ethylene glycol | 0.2 | 3 | 16.3 | 26.1 | 100 |
| 14 | 100 | 40 | None | Di-ethylene glycol | 2 | 3.5 | 38 | 60.8 | 95 |
| 15 | 100 | 40 | None | Beta-ethoxy ethanol | 2 | 3.5 | 44 | 70.4 | 95 |
| 16 | 100 | 40 | None | Beta-phenoxy ethanol | 2 | 3.5 | 23 | 36.8 | 98 |
| 17 | 100 | 40 | None | Beta-(4-tertiary-butyl phenoxy) ethanol | 2 | 3.5 | 25 | 40 | 96 |

[1] No observable reaction.  [2] Only 2.5% of the NaOH reacted.  [3] Only 0.05% of the NaOH reacted.  [4] Only 4% of the NaOH reacted.

In the above table, comparison of run 1 with run 3, of run 4 with run 5, of run 6 with run 7, and of run 8 with runs 11–17 will show that glycols and hydroxy-ethers are very effective catalysts for the reaction. A comparison of run 2 with run 3 and of runs 9 and 10 with runs 11–17 will demonstrate that the glycols and hydroxy-ethers are far more effective than monohydric alcohols in promoting the reaction. Runs 11-17 when compared with one another, indicate that hydroxy-ethers are usually more active than a simple glycol as catalysts. The table also shows that the new catalysts are effective in promoting the reaction, regardless of whether or not water is present as a reaction medium, but that the reaction occurs more favorably as the proportion of water is decreased. A small proportion of water, e. g., water in amount representing 20 per cent or less of the weight of alkali, is usually not detrimental and may even favor the reaction, but the presence of a larger proportion of water tends to retard the reaction.

*Example 2*

Trichloro-ethane was heated with flaked sodium hydroxide to 90° C. No reaction was observable. A mixture of 1500 grams of trichloro ethane, 200 grams of flaked sodium hydroxide, and 1 gram of poly-ethylene glycol (a mixture of diethylene glycol, triethylene glycol, etc.) was heated with stirring at a temperature of 90° C., whereupon vapors of asymmetrical dichloro ethylene were evolved. The vapors were cooled to condense the product. After 8.5 hours of heating 470 grams of dichloro ethylene had been collected and only 0.2 gram of sodium hydroxide remained unreacted. There was recovered 831 grams of unreacted trichloro-ethane. The yield of dichloro-ethylene was 97 per cent of theoretical based on the sodium hydroxide initially employed and 96 per cent of theoretical based on the trichloro-ethane consumed.

*Example 3*

A mixture of 385 grams of unsymmetrical tetrachloro-ethane, 60 grams of flaked sodium hydroxide and 0.1 gram of poly-ethylene glycol was heated with stirring to a temperature of 60° C., whereupon a vigorous reaction occurred, the temperature rose spontaneously to 110° C., and trichloro ethylene started distilling from the mixture. The mixture was maintained at 110° C. for 1.5 hours, at the end of which time only 0.6 gram of the sodium hydroxide remained unreacted. The yield of trichloro-ethylene was practically quantitative, based both upon the sodium hydroxide employed and upon the tetrachloro ethane consumed.

*Example 4*

To a mixture of 100 grams of ethylene chloride and 40 grams of flaked sodium hydroxide, 2 grams of tetraethylene glycol was added. The reaction started at room temperature immediately after addition of the tetraethylene glycol, as evidenced by the fact that vinyl chloride was evolved and the temperature rose spontaneously to about 60° C., where it was held by cooling the reaction vessel with water for about 0.5 hour. The reaction subsided about 1.5 hours after its start. No external heat was applied at any stage of the reaction. During the reaction, the vapors evolved were passed into a cooler, wherein the vinyl chloride product was condensed. 43 grams of vinyl chloride was collected. 10 grams of sodium hydroxide remained unreacted after the reaction had subsided. The yield of vinyl chloride was 68.8 per cent of theoretical, based on the sodium hydroxide initially employed, or 91.8 per cent based on the sodium hydroxide consumed.

The invention may be practiced in still other ways. For instance, the sodium hydroxide may, if desired, be employed in aqueous or alcoholic solution, as hereinbefore pointed out, although the employment of an alcohol medium involves unnecessary expense and the presence of water retards the rate of reaction. However, we have successfully used a 40 per cent by weight concentrated aqueous sodium hydroxide solution in dehydrohalogenation reactions carried out in the presence of our catalyst. Potassium hydroxide may, of course, be used in place of sodium hydroxide, but there usually is no advantage in making such substitution. Neutral inorganic salts such as sodium chloride, sodium sulphate, etc., do not have detrimental effect on the reaction.

In the following claims, the generic term "poly-glycol" refers to the di-hydroxy ethers derived from two or more molecules of a simple glycol. Examples of poly-glycols are diethylene glycol, triethylene glycol, tetraethylene glycol, dipropylene glycol, etc.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of splitting a hydrogen halide from the molecule of a halogenated aliphatic hydrocarbon by reacting the latter with an alkali, the step of promoting the reaction by carrying it out in the presence of a minor proportion of an aliphatic polyhydric alcohol.

2. In a method of splitting hydrogen halide from the molecule of a halogenated aliphatic hydrocarbon by reacting the latter with an alkali metal hydroxide, the step of promoting the reaction by carrying it out in the presence of a catalytic amount of a polyglycol.

3. In a method of making vinyl chloride by reacting ethylene chloride with an alkali, the step of promoting the reaction by carrying it out in the presence of a catalytic amount of a compound selected from the class consisting of aliphatic hydroxy-ethers, aryloxy-aliphatic alcohols, and aliphatic polyhydric alcohols.

4. In a method of making asymmetric dichloro ethylene by reacting tri-chloro ethane with an alkali, the step of promoting the reaction by carrying it out in the presence of a catalytic amount of a compound selected from the class consisting of aliphatic hydroxy-ethers, aryloxy-aliphatic alcohols, and aliphatic polyhydric alcohols.

5. In a method of making tri-chloro ethylene by heating tetra-chloro ethane with an alkali, the step of promoting the reaction by carrying it out in the presence of a catalytic amount of a compound selected from the class consisting of aliphatic hydroxy-ethers, aryloxy-aliphatic alcohols, and aliphatic polyhydric alcohols.

6. In a method of splitting hydrogen halide from the molecule of a halogenated aliphatic hydrocarbon by reacting the latter with sodium hydroxide, the step of promoting the reaction by carrying it out in the presence of a minor proportion of a compound selected from the class consisting of aliphatic hydroxy-ethers, aryloxy-aliphatic alcohols and aliphatic polyhydric alcohols.

7. In a method of splitting hydrogen halide from the molecule of a halogenated aliphatic hydrocarbon by reacting the latter with sodium hydroxide, the step of promoting the reaction by carrying it out in the presence of a catalytic amount of a polyglycol.

8. In a method of splitting hydrogen chloride from the molecule of a chlorinated aliphatic hydrocarbon by reacting the latter with sodium hydroxide, the step of promoting the reaction by carrying it out in the presence of a catalytic amount of a polyglycol.

9. In a method of making vinyl chloride by reacting ethylene chloride with sodium hydroxide, the step of promoting the reaction by carrying it out in the presence of a minor proportion of a polyglycol.

10. In a method of making a symmetric dichloro-ethylene by reacting trichloro-ethane with sodium hydroxide, the step of promoting the reaction by carrying it out in the presence of a catalytic amount of a polyglycol.

11. In a method of making trichloro-ethylene by reacting tetrachloro-ethane with sodium hydroxide, the step of promoting the reaction by carrying it out in the presence of a catalytic amount of polyglycol.

12. In a method wherein an alkali is reacted with an organic compound containing a hydrogen atom and a halogen atom attached to adjacent carbon atoms in a non-aromatic part of the molecule to split hydrogen halide from the molecule and form an unsaturated linkage between said adjacent carbon atoms, the step of promoting the reaction by carrying it out in the presence of a minor proportion of a compound selected from the class consisting of aliphatic hydroxy-ethers, aryloxy-aliphatic alcohols and aliphatic polyhydric alcohols.

13. In a method wherein an alkali is reacted with an organic compound containing a hydrogen atom and a chlorine atom attached to adjacent carbon atoms in a non-aromatic part of the molecule to split hydrogen chloride from the molecule and form an unsaturated linkage between said adjacent carbon atoms, the step of promoting the reaction by carrying it out in the presence of a minor proportion of a compound selected from the class consisting of aliphatic hydroxy-ethers, aryloxy-aliphatic alcohols and aliphatic polyhydric alcohols.

CHARLES J. STROSACKER.
FORREST C. AMSTUTZ.